Oct. 13, 1964  H. W. HARMAN  3,153,123
RESILIENT ABSORBER ON MICROPHONE STAND
Filed Jan. 25, 1960
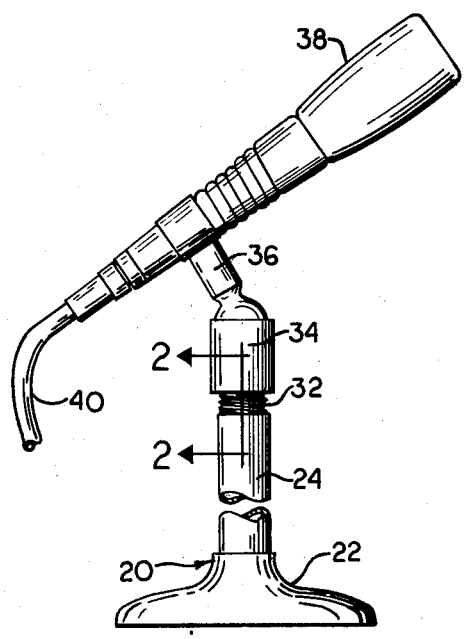
FIG. I
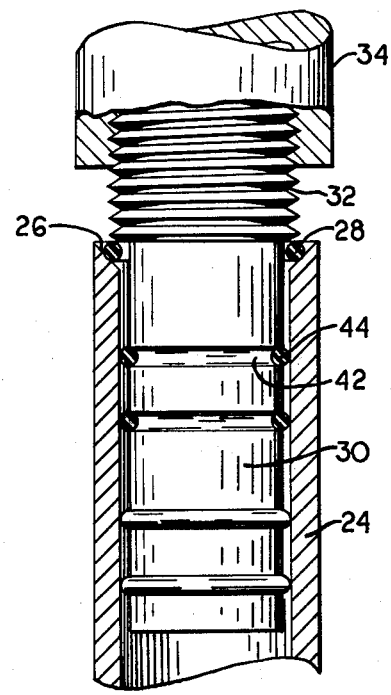
FIG. 2
INVENTOR.
HAL W. HARMAN
ATTORNEYS

United States Patent Office 3,153,123
Patented Oct. 13, 1964

3,153,123
RESILIENT ABSORBER ON MICROPHONE STAND
Hal W. Harman, 1214 Texas St., El Paso, Tex.
Filed Jan. 25, 1960, Ser. No. 4,331
1 Claim. (Cl. 179—148)

The present invention relates to a microphone carrier and particularly to a stand for carrying a microphone.

In carrying out the present invention, vibration absorbing means is interposed between the stand per se and the microphone carried thereby.

The advantage of the present invention will be apparent from the following description, reference being had to the accompanying drawings, wherein a preferred embodiment of the invention is illustrated.

In the drawings:

FIG. 1 is a side view of a microphone stand and a microphone carried thereby; and FIG. 2 is a fragmentary longitudinal sectional view taken on line 2—2 of FIG. 1.

Referring more in detail to the drawings, the stand 20 comprises any suitable form of base such as that shown at 22. The base carries an upright stand element, herein shown as a tube 24. The extreme upper end of this tube is beveled downwardly and inwardly as at 26 for receiving a washer 28.

A microphone carrying element has telescopic relationship with the stand element 24 and is herein shown as a cylindrically shaped, elongated stud or shank 30 having an enlarged threaded head 32. This head 32 carries the connector 34 which in turn carries the swivel arm 36. The swivel arm 36 carries the microphone 38. The wires leading to the microphone are indicated at 40.

The stud 30 is spaced from the interior wall of the tube 24 and is provided with a plurality of circumferential grooves 42. Preferably four of these grooves are provided, and are spaced vertically from one another. Each groove carries a vibration absorbing means in the form of an O-ring 44. These O-rings, like O-ring 28, are preferably formed of soft rubber or synthetic rubber.

The microphone stand is usually formed of metal including the tube 24. Difficulty has been experienced in transmitting vibrations from the floor or table, upon which the stand rests, to the microphone. These vibrations cause distorting of the sound being amplified by the microphone. I have found that these extraneous vibrations can be completely eliminated by the structure herein shown, namely by insulating the microphone per se from the base.

The normal outside diameter of each of the O-rings 44 is slightly larger than the inside diameter of the tube 24 and since the O-rings are formed of resilient material, the stud 30 is yieldingly held within the tube 24 and therefore cannot be accidentally removed.

Inasmuch as the microphone is held in telescoping and operative position on the stand merely by the yieldable O-rings, it can be readily removed from, for example, a floor stand and readily inserted in operative and yieldingly-held position in, for example, a desk stand. Also, the O-rings provide a non-slipping grip for the hand of the user when he is using the microphone removed from the stand.

While the form of embodiment herein shown and described constitutes a preferred form, it is to be understood that other forms may be adopted falling within the scope of the claim that follows.

I claim:

In combination, an upright stand, said stand having an elongated, longitudinally extending circular opening in the upper portion thereof; a carrier; a microphone carried by the carrier; wires for the microphone carried by the carrier, said carrier including an elongated circularly shaped shank in telescoping readily removable relationship with the opening in the stand, said shank being of smaller diameter than the opening in the stand, and having a plurality of circumferential grooves thereabout throughout the major portion of the length thereof; and vibration absorbing rubber rings in said grooves and engaging the wall of said opening.

References Cited in the file of this patent
FOREIGN PATENTS

| | | |
|---|---|---|
| 668,730 | Great Britain | Mar. 19, 1952 |
| 137,597 | Sweden | Oct. 14, 1952 |